United States Patent [19]

Lindstrom

[11] Patent Number: 5,104,557
[45] Date of Patent: Apr. 14, 1992

[54] MERCAPTAN COMPOSITION FOR DISSOLVING SULFUR AND PROCESS FOR ITS USE

[75] Inventor: Michael J. Lindstrom, Dowington, Pa.

[73] Assignee: Elf Atochem North America, Inc., Philadelphia, Pa.

[21] Appl. No.: 546,478

[22] Filed: Jun. 29, 1990

[51] Int. Cl.$^5$ ............................................. E21B 43/00
[52] U.S. Cl. ................................ 252/8.552; 166/312; 507/90
[58] Field of Search ............................. 252/8.3, 8.552; 166/312

[56] References Cited

U.S. PATENT DOCUMENTS

| | | | |
|---|---|---|---|
| 1,911,446 | 5/1933 | Grebe et al. | 252/8.55 |
| 2,237,625 | 4/1941 | Olin . | |
| 2,839,465 | 6/1958 | Jones | 252/8.55 |
| 2,978,026 | 4/1961 | Bemis | 166/44 |
| 3,197,396 | 7/1965 | Stedman | 208/48 |
| 3,531,160 | 9/1970 | Fisher | 166/312 X |
| 3,545,916 | 12/1970 | Deicher et al. . | |
| 3,846,311 | 11/1974 | Sharp et al. . | |
| 4,239,630 | 12/1980 | Atkinson et al. | 166/312 X |
| 4,248,717 | 2/1981 | Sharp et al. | 166/312 X |
| 4,290,900 | 9/1981 | Sharp et al. | 166/312 X |
| 4,728,447 | 3/1988 | Labat | 166/312 X |
| 4,804,485 | 2/1989 | Carroll et al. . | |

FOREIGN PATENT DOCUMENTS 974912 9/1975 Canada .

OTHER PUBLICATIONS

Freedman, Pure & Appln. Chem., vol. 58, No. 6, pp. 857-868 (1986).

Primary Examiner—Robert L. Stoll
Assistant Examiner—Gary L. Geist

[57] ABSTRACT

A composition is disclosed for dissolving sulfur and preventing or removing sulfur plugs from sour gas and oil wells or other conduits through which sulfur bearing liquids flow which comprises a major proportion of a liquid or gaseous mercaptan, a minor proportion of a catalyst which is a substantially water-insoluble amine, and minor amount of an activator which is a compound of the formula $$R-(OCH_2CH_2)_x(OCH_2CH)_y-OH$$
$$\overset{|}{CH_3}$$

where R is hydrogen, alkyl, aryl or alkaryl and the alkyl moieties have from 1 to 24 carbon atoms, and x and y are independent values between 0 and 24 provided that x or y is at least 1; a method is also disclosed wherein said composition in an effective amount is injected into a conduit to prevent or remove sulfur plugging, and the composition containing dissolved sulfur is optionally recovered.

23 Claims, No Drawings

MERCAPTAN COMPOSITION FOR DISSOLVING SULFUR AND PROCESS FOR ITS USE

BACKGROUND OF THE INVENTION

This invention is a composition of matter comprising an alkyl- or aryl mercaptan, an amine or amine mixtures and a polyalkylene glycol or ether thereof. More particularly, it is a composition useful for the dissolution of sulfur, particularly in sour production wells and comprises a major amount of an alkyl- and/or aryl mercaptan, a catalytic amount of a specified amine or amine mixture, and an activating amount of a polyalkylene glycol or ether thereof, hereinafter both referred to as a polyalkylene glycol. The invention also includes the process of using said composition downhole in sour gas or oil producing wells and in other conduits for transfer of sulfur-containing liquids.

In the processing of sour production wells, sulfur may form deposits that can plug the well and cause the reduction or cessation of production. It is known to employ various solvent materials such as carbon disulfide, aqueous alkylamines, dialkyl disulfides, sodium hydrosulfide and such solvents catalyzed with amines and mercaptan-amine combinations to improve sulfur uptake.

U.S. Pat. No. 2,237,625 to Olin discloses the process for sulfurizing organic compounds including alkyl and aryl mercaptans in the presence of an amine catalyst to provide products useful as E.P. lubricants and rubber accelerators.

The use of various polyalkylene glycols, Crown ethers and other complexing agents to enhance the rates of various chemical reactions is known. Use of these compounds or agents in mixed phase systems is referred to as phase transfer catalysis.

STATEMENT OF THE INVENTION

This invention is a composition of matter of beneficial use as a sulfur solvent for preventing or removing sulfur plugs comprising a major proportion of a liquid or gaseous organic mercaptan, a minor proportion of a substantially water-insoluble amine, and a minor proportion of a compound having the formula:

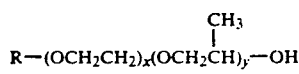

wherein R is hydrogen, alkyl, aryl or alkaryl and the alkyl moieties have from 1 to 24 carbon atoms, and x and y are independent values between 0 and 24 provided that x or y is at least 1.

The invention also includes a method for utilizing the above-described composition in the prevention or removal of sulfur plugging from gas and oil well tubulars or other conduits used to process or transport sulfur-containing gas or oil products. The method comprises injecting an effective amount of such composition into said conducts to dissolve sulfur and, optionally, recovering the sulfur-containing composition.

DETAILED DESCRIPTION OF THE INVENTION

The present invention is a composition for the dissolution of elemental sulfur and may be used whenever and wherever a requirement for sulfur removal exists. One such application is for the prevention or removal of sulfur plugs in sour gas wells. It is already known to employ catalyzed disulfide or polysulfide mixtures for continuous injection into a sour gas well to take up the sulfur that is dissolved in the sour gas thereby preventing the formation of a sulfur plug which could interrupt production. It is also known to treat wells that are already sulfur plugged by batch treatment with sulfur solvents, such as catalyzed disulfides, on a routine basis. This is usually done by introducing the solvent above the sulfur plug either through the well annulus or through coiled tubing. Since amine-catalyzed, disulfide sulfur solvents require activation by hydrogen sulfide to work effectively, and the amount of hydrogen sulfide above the sulfur plug in a plugged well is limited or nonexistant, such catalyzed disulfides are not very effective for this application. Therefore, in industrial processes where sulfur deposition is a problem, hydrogen sulfide activation of sulfur solvents is inconvenient and impractical, and a need arises for sulfur solvents that perform effectively without prior hydrogen sulfide activation.

The ability of the prior art disulfide-based sulfur solvents to dissolve sulfur is determined by the hydrocarbon radical of the disulfide. For example, catalyzed dimethyl disulfide can dissolve about 140–160% of weight of sulfur, while catalyzed dioctyl disulfide holds only 10–15% sulfur. The mercaptan composition of this invention has a distinct advantage over the catalyzed disulfide-based solvent system in that the mercaptan will consume additional sulfur in accordance with Equation 1 and convert it to hydrogen sulfide.

$$2R^1SH + S \rightarrow R^1SSR^1 + H_2S \qquad (1)$$

While the sulfur is used to produce H$_2$S and does not enter into the formation of the resulting disulfide, it has, nonetheless, been eliminated as far as sulfur plugging is concerned. In addition, conversion of sulfur to H$_2$S reduces the overall amount of sulfur-laden solvent that needs to be regenerated.

After generation of disulfide, as in Equation 1, additional sulfur is consumed by polysulfide formation in accordance with Equation 2.

$$R^1SSR^1 + S_x \rightarrow R^1SS_xSR^1 \qquad (2)$$

Both Equations 1 and 2 require the presence of a suitable catalyst.

While the use of amines to catalyze the reactions of mercaptans with elemental sulfur to produce various di-and polysulfides is well known in the art, it has now been discovered that the addition of relatively small amounts of polyalkylene glycols, herein referred to as activators, markedly increases the rate at which the amine-catalyzed reaction of mercaptans and sulfur proceeds.

The composition of matter of this invention preferably comprises a major amount of an organic mercaptan, generally at least in excess of 50 percent, preferably at least 60 percent, and more preferably at least about 97 weight percent of the composition.

The organic mercaptan of preferred use in the invention has the general formula:

$$R^2SH$$

where R$^2$ is alkyl, alkaryl, aryl, cycloalkyl, hydroxyalkyl, alkoxyalkyl, thioalkyl or thioaryl. The alkyl moiety of these groups will contain from 1 to 24 carbon atoms. More preferred mercaptans are liquid or gaseous compounds where $R^2$ is an alkyl group having from 1 to 24, with the most preferred having from 6 to 9 carbon atoms. Suitable additional examples are methyl mercaptan, n-octyl mercaptan, cyclohexyl mercaptan and n-dodecyl mercaptan. The use of heavier mercaptans, i.e., mercaptans having boiling points higher than 100° C., to remove downhole sulfur plugs or to prevent plug formation, circumvents the need to recover substantial amounts of the mercaptan from the gas stream. Selection of the proper mercaptan is dependent upon a number of factors including temperature at which the composition will be used, and the mode of recovery of formed polysulfides and unreacted mercaptans. Additionally, if the composition of this invention is to be used downhole, it is desirable to select a mercaptan which is water-insoluble, otherwise water which can be present downhole will dissolve the mercaptan making recovery more difficult and costly.

The organic mercaptan of the composition is catalyzed by the addition of from 0.01 to 20.0, preferably 0.05 to 1.5 weight percent of a catalyst or mixture of catalysts selected from the following group of amines:

(A) $R^3R^4NH$ where $R^3$ and $R^4$ are independently alkyl, alkaryl, aryl, cycloalkyl, hydroxyalkyl or alkoxyalkyl groups having from 1 to 24, preferably 4 to 18 carbon atoms in the alkyl moieties and only one of $R^3$ or $R^4$ may be hydrogen. A preferred amine of this formula (A) is an alkoxyalkylamine having from 8 to 18 carbons in the alkoxy radical and from 1 to 6 carbons in the alkyl radical. Most preferably the alkoxyalkylamine is tridecyloxypropaneamine. Examples of other specific amines are dibutylamine, cyclohexylamine, ethanolamine aniline, n-methylaniline, hexadecyloxypropaneamine, methoxypropaneamine and toluidine. Tertiary amines are not suitable for the practice of this invention. $R^3$ and $R^4$ groups may comprise, together with the nitrogen (N) of the amine, a heterocyclic ring such as pyrrole, pyrrolidine, piperidine or morpholine;

(B) polyalkyleneoxyamines as disclosed in U.S. Pat. No. 4,804,485 issued Feb. 14, 1989;

(C) polyalkyleneoxypolyamines as disclosed in the aforemention U.S. Pat. No. 4,804,485, such patent incorporated herein by reference, particularly that portion of said patent including from column 2, line 57 through column 5, line 14 and column 5, line 65 through column 6, line 12. Preferred polyalkyleneoxyamines and -polyamines have from 2 to 4 carbons in the alkylene moieties; or (D) an amine of the following formula;

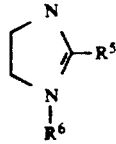

where $R^5$ and $R^5$ are independently alkyl, aryl, hydroxyalkyl, alkaryl or alkoxyalkyl having found 1 to 25 carbon atoms in the alkyl moieties. An example of such compounds is 1-hydroxyethyl-2-heptadecyl imidazoline (Unamine S; a trademark of Lonza Chemicals). These materials are often used in combination with various inert hydrocarbon-type solvents to inhibit corrosion in sour-gas equipment and, as part of this composition, would serve a dual purpose as a sulfur-dissolving catalyst, and a downhole corrosion inhibitor.

More preferred amine catalysts are Jeffamine ®D230 and Jeffamine ®ED600, while the most preferred catalyst is tridecyloxypropaneamine $[C_{13}H_{27}OCH_2CH_2CH_2\text{-}NH_2$, also known under several brand names including "Jetamine PE-13" (a trademark of Jetco Chemicals), "Adogen 183" (a trademark of Sheerex Chemical), and "PA-17" (a trademark of Exxon Chemical)]. Structures of Jeffamine D-230 and ED600 are shown below:

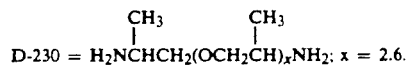

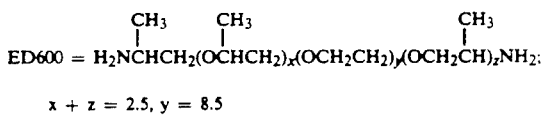

$x + z = 2.5, y = 8.5$

While amounts of up to 20 wt % of amines are generally used, amounts up to a minor proportion of the composition will be operable. Increased amounts of amine catalysts, within the prescribed range, will result in improved performance, but minimum amounts are preferred for economic reasons. Additionally, for reasons previously stated, it is desirable that an amine catalyst that is not substantially soluble in water be chosen. Amine catalysts that boil substantially lower than the mercaptan of the composition may not be suitable for downhole applications since they may volatilize out of the composition due to high temperatures encountered downhole, thus reducing or rendering ineffective the sulfur-uptake capability of the composition. While liquid amines are preferred due to ease of handling, solid amines are also within the scope of this invention provided they are soluble in the composition and preferably insoluble in water.

Suitable activators are used in amounts in the range of from about 0.01 to 20%, preferably 0.05 to 1.5% based on the weight of the composition. Amounts up to a minor amount of the composition may be used but provide no greater advantage and are commercially impractical. Such activators are selected from compounds or mixtures thereof having the following formula:

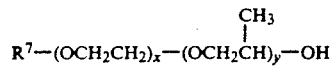

where $R^7$ is independently hydrogen, alkyl, aryl or alkaryl where the alkyl moieties have from 1 to 24, preferably 1 to 12 carbon atoms, and x and y are independently values between 0 and 24 provided that either x or y equals at least 1. Examples of such activators include:

$O(CH_2CH_2OCH_2CH_2OH)_2$

Tetraethylene glycol

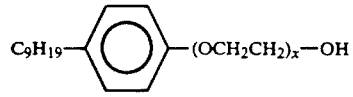

(where x=4, Triton N-42; trademark of Rohm & Haas Co.)

Crown ethers, exemplified by, but not limited to the following examples, are also suitable activators; 12-Crown-4 (1,4,7,10- tetraoxacyclodecane), 15-Crown-5 (1,4,7,10-pentaoxacyclopentadecane), and 18-Crown-6 (1,4,7,10,13,16-hexaoxacyclooctadecane).

A preferred composition of this invention is n-octyl mercaptan, 1.0 wt % Jeffamine ED600, and 1.5 wt % tetraethylene glycol. A more preferred composition is n-octyl mercaptan, 1.0 wt % tridecyloxypropaneamine, and 1.5 wt % Triton N-42. The most preferred composition is n-octyl mercaptan, 1.0 wt % tridecyloxypropaneamine, and 1.5 wt % tetraethylene glycol.

As previously stated, the method of this invention comprises injecting an effective amount of the described composition into a gas or oil well tubular or conduit used to transport sulfur-containing gas or oil products to thereby dissolve sulfur and prevent or remove sulfur plugging of the tubular or conduit, and, thereafter, optionally recovering the composition containing dissolved sulfur.

In carrying out the process of the invention the composition described above may be introduced into the well from which deposits of sulfur are to be removed either by means of downhole injection tubulars or directly into the production tubing.

The method may be practiced batchwise or continuously to provide tubulars or conduits free of sulfur blockage.

For batch deplugging of a sulfured-off well, the composition can be introduced directly through the production tubing above the plug. The composition is then allowed to soak for a sufficient amount of time (e.g. 1-24 Hrs) to dissolve the sulfur plug, then the well is flowed with the sulfur-laden solvent composition recovered in a suitable separation device.

Alternatively, the sulfur-dissolving composition can be injected continuously via downhole injection tubulars while the well is flowing thereby preventing the formation of sulfur deposits. In this mode, existing deposits are removed as well as sulfur that is dissolved in the gas or oil.

Effective amounts of the composition for use herein will vary from well to well and depend on the content of sulfur in the crude gas or oil and the degree of blockage in the system. Generally, experiments must be carried out in a particular well to find optimum treatment amounts and procedures. Sufficient amount of composition is injected into the conduit to react with the sulfur which is present therein or which continually enters the conduit as a component of downhole sour gas or crude oil.

The use of the compositions described herein to unplug sulfur deposits whereby the compositions are diluted with an inert solvent like diesel oil or condensate, is well within the scope of this invention.

EXAMPLES

General Procedure: In a 500mL 3-necked flask fitted with a caustic scrubber was added about 97.5 wt. % (10mL-8.43 g) of n-octyl mercaptan followed by the addition of 100μL (weight % listed in Table 1) each of amine and/or activator. To this was added 3.5g powdered sulfur in one portion, then the mixture was magnetically stirred. Vigorous evolution of H$_2$S commenced immediately upon stirring. The time for complete dissolution of the sulfur was noted and the results are summarized in Table 1.

TABLE 1

| Amine<br>100 μL (1.0 wt. %) | Activator<br>100 μL (1.5 wt. %) | Dissolution<br>Time (min) |
| --- | --- | --- |
| — | Tetraethylene Glycol (TEG) | >30 |
| Adogen 183 | — | 20.0 |
| Adogen 183 | TEG | 1.8 |
| Adogen 183 | Triton N-42 | 3.8 |
| Adogen 183 | 18-Crown-5 | 2.2 |
| Jeffamine D230 | — | >30 |
| Jeffamine D230 | TEG | 12.2 |
| Jeffamine D230 | Triton N-42 | 13.4 |
| Jeffamine ED600 | — | 10.0 |
| Jeffamine ED600 | TEG | 4.3 |
| Jeffamine ED600 | Triton N-42 | 8.7 |
| Triethylamine | — | >30 |
| Triethylamine | TEG | >30 |
| Tripropylamine | — | >30 |
| Tripropylamine | TEG | >30 |
| Dibutylamine | — | 15.5 |
| Dibutylamine | TEG | 7.3 |
| Cyclohexylamine | — | 22.0 |
| Cyclohexylamine | TEG | 5.0 |

These examples exemplify the marked rate enhancement effect of various activators.

I claim:

1. A composition of matter comprising a major proportion of a liquid or gaseous mercaptan, a minor proportion of a substantially water-insoluble amine, and a minor proportion of an activator having the formula:

$$R-(OCH_2CH_2)_x-(OCH_2CH)_y-OH$$
$$\overset{\displaystyle |}{\underset{\displaystyle CH_3}{}}$$

where R is hydrogen, alkyl, aryl or alkaryl, the alkyl moieties having from 1 to 24 carbon atoms, and x and y are independent values between 0 and 24 provided that x or y is at least 1.

2. The composition of claim 1 wherein said mercaptan has the formula:

$$R^2SH$$

where R$^2$ is alkyl, alkaryl, aryl, cycloalkyl, hydroxyalkyl, alkoxyalkyl, thioalkyl or thioaryl wherein the alkyl moieties have from 1 to 24 carbon atoms.

3. The composition of claim 2 wherein R$^2$ is an alkyl group having from 6 to 9 carbon atoms and said mercaptan is present in the composition in an amount of at least 60 weight percent.

4. The composition of claim 2 wherein said amine is a compound as follows:

A) an amine having the formula:

$$R^3R^4NH$$

where R$^3$ and R$^4$ are independently alkyl, alkaryl, aryl, cycloalkyl, hydroxyalkyl or alkoxyalkyl groups having from 1 to 24 carbon atoms in the alkyl moieties, or R$^3$ and R$^4$ are together linked with the nitrogen of said amine to form a heterocyclic ring compound, B) a polyalkyleneoxyamine, C) a polyalkyleneoxypolyamine, or D) an amine of the formula:

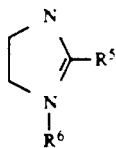

where $R^5$ and $R^6$ are independently alkyl, aryl, hydroxyalkyl, alkaryl or alkoxyalkyl groups having from 1 to 25 carbon atoms in the alkyl moieties.

5. The composition of claim 3 wherein said amine is a compound as follows:

A) an amine having the formula:

$$R^3R^4NH$$

where $R^3$ and $R^4$ are independently alkyl, alkaryl, aryl, cycloalkyl, hydroxyalkyl, or alkoxyalkyl groups having from 1 to 24 carbon atoms in the alkyl moieties, or $R^3$ and $R^4$ are together linked with the nitrogen of said amine to form a heterocyclic ring compound, B) a polyalkyleneoxyamine,
C) a polyalkyleneoxypolyamine, or
D) an amine of the formula:

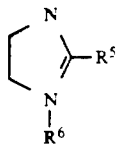

where $R^5$ and $R^6$ are independently alkyl, aryl, hydroxyalkyl, alkaryl or alkoxyalkyl groups having from 1 to 25 carbon atoms in the alkyl moieties.

6. The composition of claim 5 wherein said amine is a polyalkyleneoxyamine, having 2 to 4 carbon atoms in the alkylene moiety, in an amount ranging from 0.05 to 1.5% by weight of the composition.

7. The composition of claim 5 wherein said amine is a polyalkyleneoxypolyamine, having 2 to 4 carbon atoms in the alkylene moiety, in an amount ranging from 0.05 to 1.5% by weight of the composition.

8. The composition of claim 5 wherein said amine has the formula $R^3R^4NH$ where $R^3$ is an alkoxyalkyl radical wherein the alkoxy moiety has from 8 to 18 carbon atoms and the alkyl moiety has from 1 to 6 carbon atoms and $R^4$ is hydrogen said amine being present in an amount ranging from 0.05 to 1.5% by weight of the composition.

9. The composition of claim 7 wherein said polyalkyleneoxypolyamine has the following formula:

where $x+y=2$ to 3 and $z=7.5$ to 9.5.

10. The composition of claim 7 wherein said polyalkyleneoxypolyamine has the following formula:

where $x=2$ to 3

11. The composition of claim 8 wherein said amine is tridecyloxypropaneamine.

12. The composition of claim 9 wherein said activator is tetraethylene glycol in an amount ranging from 0.05 to 1.5% by weight of the composition.

13. The composition of claim 11 wherein said activator is tetraethylene glycol in an amount ranging from 0.05 to 1.5% by weight of the composition.

14. The composition of claim 11 wherein said activator is a compound having the formula:

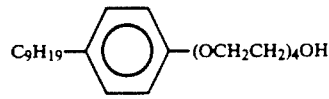

15. The composition of claim 13 wherein said mercaptan is n-octyl mercaptan and is present in an amount of at least 97% by weight of the composition.

16. The composition of claim 14 wherein said mercaptan is n-octyl mercaptan and is present in an amount of at least 97% by weight of the composition.

17. A method of preventing or removing sulfur plug formation in a conduit which comprises injecting into said conduit an effective amount of a composition comprising a major proportion of liquid or gaseous mercaptan, a minor proportion of a substantially water-insoluble amine and a minor proportion of an activator having the formula:

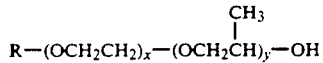

wherein R is hydrogen, alkyl, aryl or alkaryl where the alkyl moieties have from 1 to 24 carbon atoms and x and y are independent values of from 0 to 24 provided that x or y is at least 1, and, optionally, recovering said composition containing dissolved sulfur 18. The method of claim 17 wherein said composition is continually injected into a gas or oil well.

19. The method of claim 17 wherein said composition is injected batchwise into said conduit.

20. The method of claim 17 wherein said composition comprises at least about 97 weight percent of n-octyl mercaptan, from 0.05 to 1.5 weight percent of a polyalkyleneoxyamine or polyalkyleneoxypolyamine having from 2 to 4 carbon atoms in the alkylene moieties and from 0.05 to 1.5 weight percent of said activator.

21. The method of claim 20 wherein said polyalkyleneoxypolyamine has the formula:

where $x+y=2$ to 3 and $z=7.5$ to 9.5, and the activator is tetraethylene glycol.

22. The method of claim 20 wherein said polyalkyleneoxypolyamine has the formula:

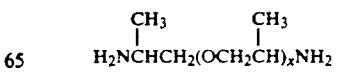

where $x=2$ to 3, and the activator is a compound of the formula:

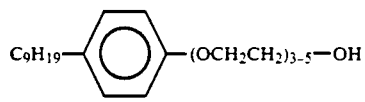
tetraethylene glycol.
23. The method of claim 17 wherein said composition comprises at least 97 weight percent of n-octyl mercaptan, from 0.05 to 1.5% weight percent of tridecyloxypropaneamine, and from 0.05 to 1.5 weight percent of tetraethylene glycol.
* * * * *